United States Patent
Park

(10) Patent No.: US 7,151,779 B2
(45) Date of Patent: Dec. 19, 2006

(54) INITIALIZATION METHOD FOR VDSL INCLUDING TONE SPACE ADJUSTMENT

(75) Inventor: Jong-hyuck Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 950 days.

(21) Appl. No.: 10/076,451

(22) Filed: Feb. 19, 2002

(65) Prior Publication Data

US 2002/0114347 A1    Aug. 22, 2002

(30) Foreign Application Priority Data

Feb. 17, 2001  (KR) ................. 2001-8011

(51) Int. Cl.
*H04J 3/16* (2006.01)
*H04B 1/38* (2006.01)

(52) U.S. Cl. ................. 370/437; 370/465; 375/222

(58) Field of Classification Search ........ 370/352–355, 370/465, 437, 468
See application file for complete search history.

(56) References Cited

U.S. PATENT DOCUMENTS

| | | | |
|---|---|---|---|
| 5,982,768 A * | 11/1999 | Bellenger et al. | 370/352 |
| 6,590,893 B1 * | 7/2003 | Hwang et al. | 370/354 |
| 6,788,705 B1 * | 9/2004 | Rango | 370/465 |
| 6,865,221 B1 * | 3/2005 | Belge | 375/222 |
| 6,865,232 B1 * | 3/2005 | Isaksson et al. | 375/260 |
| 6,885,697 B1 * | 4/2005 | Tokunaga et al. | 375/222 |
| 6,909,781 B1 * | 6/2005 | Itri | 379/399.01 |
| 6,922,444 B1 * | 7/2005 | Cai et al. | 375/260 |
| 2001/0026538 A1 * | 10/2001 | Bruss | 370/329 |
| 2002/0085514 A1 * | 7/2002 | Illidge et al. | 370/329 |
| 2005/0232171 A1 * | 10/2005 | Hasegawa et al. | 370/276 |

FOREIGN PATENT DOCUMENTS

| | | |
|---|---|---|
| EP | 0 966 135 A2 | 12/1999 |
| EP | 1 005 203 A1 | 5/2000 |

OTHER PUBLICATIONS

Notification of the First Office Action issued by the Chinese Patent Office on Jun. 25, 2004 in corresponding application 02105622.6.

(Continued)

*Primary Examiner*—Ricky Q. Ngo
*Assistant Examiner*—Warner Wong
(74) *Attorney, Agent, or Firm*—Buchanan Ingersoll & Rooney PC

(57) ABSTRACT

An initializing method for Very high bit rate Digital Subscriber Line (VDSL), including adjusting tone spaces, and a system supporting the method are provided. The method includes: (a) handshaking for exchanging basically needed information between the two stations in a first one space mode, and for determining whether or not each of the two stations supports a second tone space; (b) switching the first tone space mode to the second tone space mode by detecting a short loop in each of the two stations for adjusting a tone space when it is determined in step (a) that each of the two stations supports the second tone space; and (c) exchanging information actually needed in data communications between the two stations in the second tone space mode for an actual initialization. When a 8.625 kHz tone space is used, a data communications link can be established with only one initialization process through the ES process according to the method and accordingly time for initialization is greatly reduced. In addition, since some identical signals used in the prior art actual initialization process are also used in the ES process, which is an intermediate process, additional hardware is not needed and in software aspect, it is easy to implement the system.

11 Claims, 5 Drawing Sheets

OTHER PUBLICATIONS

John M. Cioffi et al., "Very-High-Speed Digital Subscriber Lines," IEEE Communications Magazine, Apr. 1999 (pp. 72-79).

John M. Cioffi et al., "Very-High-Speed-Digital Subscriber Lines", IEEE Communications Magazine, Apr. 1999, pp. 72-79, vol. 37, No. 4, Piscataway, NJ.

J. Cioffi et al., "Digital Subscriber Lines", Computer Networks, Feb. 25, 1999, pp. 283-311, vol. 31, No. 4, B.V., Amsterdam, NL.

Bell Alcatel, "G. VDSL: Initialisation for VDSL Systems", Apr. 14, 2000, pp. 1-16, www.vdslalliance.com/docs/785_ww9.pdf, ITU Telecommunication Standardization Sector, Geneva, Switzerland.

Samsung AIT, "Handshake and Initialization of the 8.625 kHz Tone Spacing Informative Annex for MCM VDSL", www.vdslalliance.com/docs/le141080.pdf, Committee T1—Telecommunications, Working Group, Costa Mesa, CA.

* cited by examiner

NON-STANDARD INFORMATION FIELD (NS) FORMAT

NON-STANDARD INFORMATION BLOCK FORMAT

FIG. 4C

NON-STANDARD INFORMATION FIELD-8.625 kHz MODE CODING

| Bits | | | | | | | | 8.625 kHz MODE |
|---|---|---|---|---|---|---|---|---|
| 8 | 7 | 6 | 5 | 4 | 3 | 2 | 1 | |
| 1 | 0 | 0 | 0 | 0 | 1 | 1 | 0 | 8.625 kHz MODE ID (bits 7 to 14)-Octet 1 |
| 1 | 1 | 0 | 0 | 0 | 1 | $b_2$ | $b_1$ | 8.625 kHz MODE ID (bits 1 to 6)-Octet2 (*) |
| *-$b_1$ : 8.625 kHz CAPABILITY BIT. $b_2$ : RESERVATION FOR FUTURE USE |||||||||

FIG. 5

MESSAGE CODE FOR SOC MESSAGE USED IN ES PROCESS

| SOC ESSAGE | MESSAGE CODE |
|---|---|
| O/R-ACK-ES | 0x33 (*) |
| O/R-NACK-ES | 0xCC (*) |
| O-SIGNATURE-ES | 0x31 |
| R-MSGI-ES | 0xB1 |
| *-ENTIRE PAYLOAD OF MESSAGE | | ately after a G.994.1 handshake
INITIALIZATION METHOD FOR VDSL INCLUDING TONE SPACE ADJUSTMENT

BACKGROUND OF THE INVENTION

Priority is claimed to Patent Application Number 2001-8011 filed in the Republic of Korea on Feb. 17, 2001, herein incorporated by reference.

1. Field of the Invention

The present invention relates to initialization of a digital subscriber line, and more particularly, to an initializing method for Multi-Carrier Modulation (MCM) Very high bit rate Digital Subscriber Line (VDSL), and a system supporting the method.

2. Description of the Related Art

FIG. 1 is a diagram for explaining an initialization process when an ordinary 4.3125 kHz tone space is used. A sequence on the left specifies a Special Operation Channel (SOC) which is exchanged between a VDSL Transceiver Unit at the Optical network unit (VTU-O) and a VDSL Transceiver Unit at the Remote site (VTU-R). A sequence on the right specifies a symbol type which is exchanged between VTU-O and VTU-R.

An initialization process in a VDSL, especially in a Multi-Carrier Modulation (MCM) VDSL, can be divided into a handshake process and an actual initialization process. As shown in FIG. 1, immediately after a G.994.1 handshake process is finished, an actual initialization process having a 4.3125 kHz tone space starts. In FIG. 1, just the front part of the actual initialization process is shown.

In the present VDSL standard, a space between tones (briefly, a tone space) is described as 4.3125 kHz. A 8.625 kHz tone space, twice the tone space of the present VDSL, may be used as an option. When the 8.625 kHz tone space is used, it has an advantage of using two times wider frequency band with the same Fast Fourier Transform (FFT) size. The frequency band which is currently used in the VDSL standard is 138 kHz~12 MHz. The band equal to or less than 138 kHz may be used as an option, and the band equal to or greater than 12 MHz is described as the object of future study. When a default FFT size which is 4096 points (always twice the number of tones being used) is used, the frequency band which can be used for VDSL data communications is limited to 8.832 MHz (4.3125 kHz*2048). When a 8192 point FFT size is used, it is clear that a 17.664 MHz band can be used. However, due to difficulties in realizing an FFT core (for example, complexity, speed, etc.), doubling a tone space is described as an option in the VDSL standard. When an 8.625 kHz tone space is used, a frequency band that is twice as wide can be used with the same FFT size, and therefore enhances data rate when the length of a loop is short, that is, when data can be transmitted even in a high frequency band.

In the 8.625 kHz tone space option described in the VDSL standard, in order to use the 8.625 kHz tone space, prior art handshaking and actual initialization process is performed once. Then, if it is determined according to the measured length of the loop that the 8.625 kHz tone space can improve the data speed, the same handshaking and actual initialization process is performed again based on the 8.625 kHz tone space. In this case, since the same initialization process is performed twice, the time for initializing a modem is doubled.

SUMMARY OF THE DISCLOSURE

To solve the above problems, it is a first objective of the present disclosure to provide an initializing method for a VDSL, including tone space adjustment, in which a data communications link is established by a single initialization process, by enabling to switch from a first tone space mode to a second tone space mode between a handshaking process and an actual initialization process.

It is a second objective of the present invention to provide a system for supporting an initializing method for a VDSL, including tone space adjustment, with two stations that enable to switch from a first tone space mode to a second tone space mode between a handshaking process and an actual initialization process.

To accomplish the first objective of the present invention, there is provided an initializing method for a Very high bit rate Digital Subscriber Line (VDSL) between two stations including (a) handshaking for exchanging basically needed information between the two stations in a first one space mode, and for determining whether or not each of the two stations supports a second tone space; (b) switching the first tone space mode to the second tone space mode by detecting a short loop in each of the two stations for adjusting a tone space when it is determined in step (a) that each of the two stations supports the second tone space; and (c) exchanging information actually needed in data communications between the two stations in the second tone space mode for an actual initialization.

To accomplish the second objective of the present invention, there is provided a system supporting an initializing method for a Very high bit rate Digital Subscriber Line (VDSL), the system having two stations, each of which performs a handshaking step for exchanging basically needed information between the two stations in a first one space mode; a switching step for switching from the first tone space mode to the second tone space mode by detecting a short loop, if it is determined that the station supports the second tone space; and an actual initialization step for exchanging information actually needed in data communications between the two stations in the second tone space mode.

BRIEF DESCRIPTION OF THE DRAWINGS

The above objects and advantages of the present invention will become more apparent by describing in detail preferred embodiments thereof with reference to the attached drawings in which:

FIGS. 4a through 4c are diagrams for explaining a method for permission of 8.625 kHz between two sides in a handshake process; and FIG. 5 illustrates an example of a message and a message code used in a switching process for adjusting a tone space.

DESCRIPTION OF EXEMPLARY EMBODIMENTS

Figure 1:
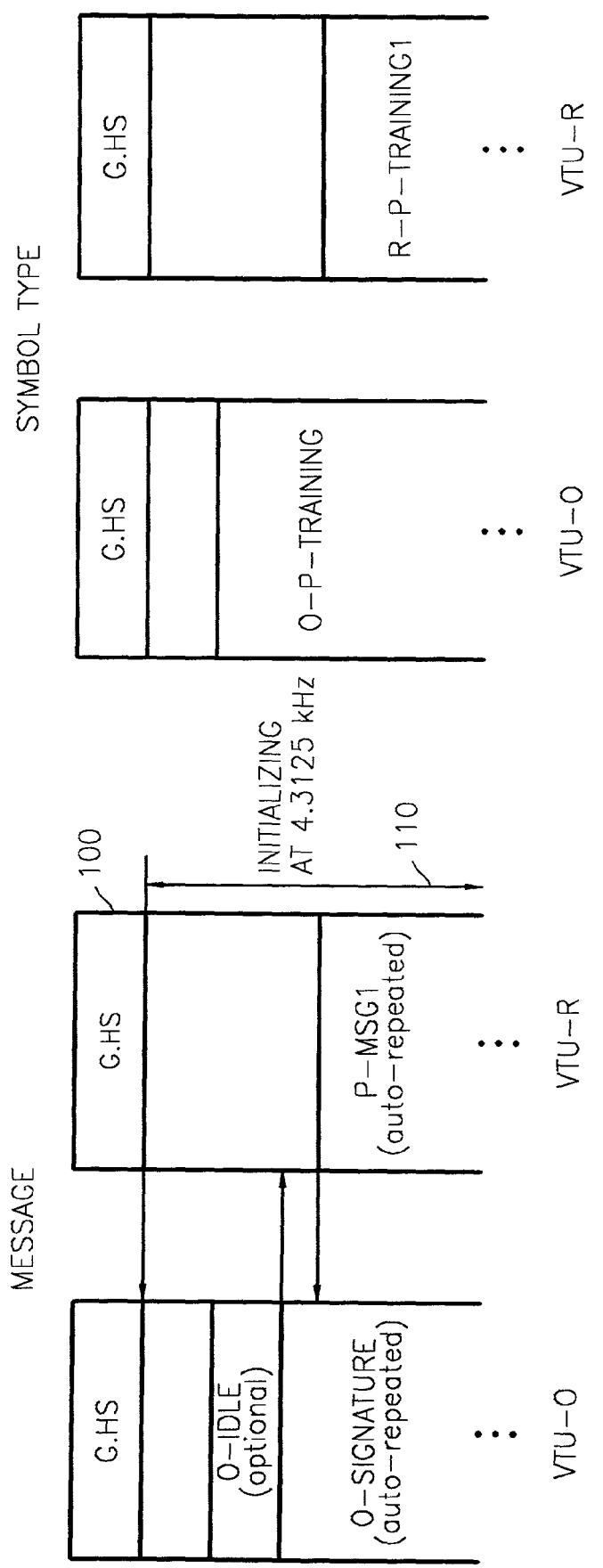
FIG. 1 is a diagram for explaining an initialization process when an ordinary 4.3125 kHz tone space is used.
Figure 2:
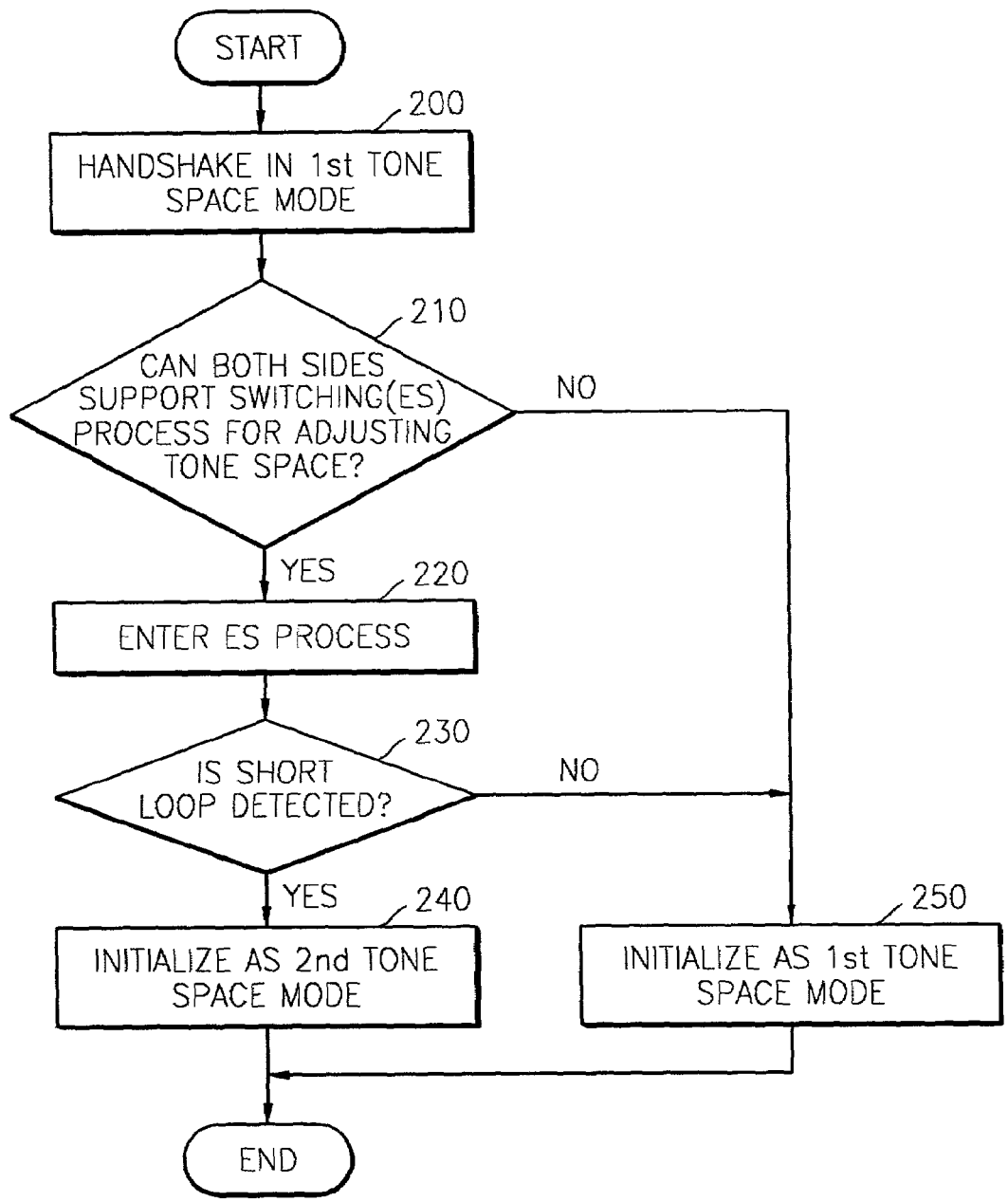
FIG. 2 is a flowchart for explaining an initializing method for a VDSL according to the present disclosure.
Figure 3:
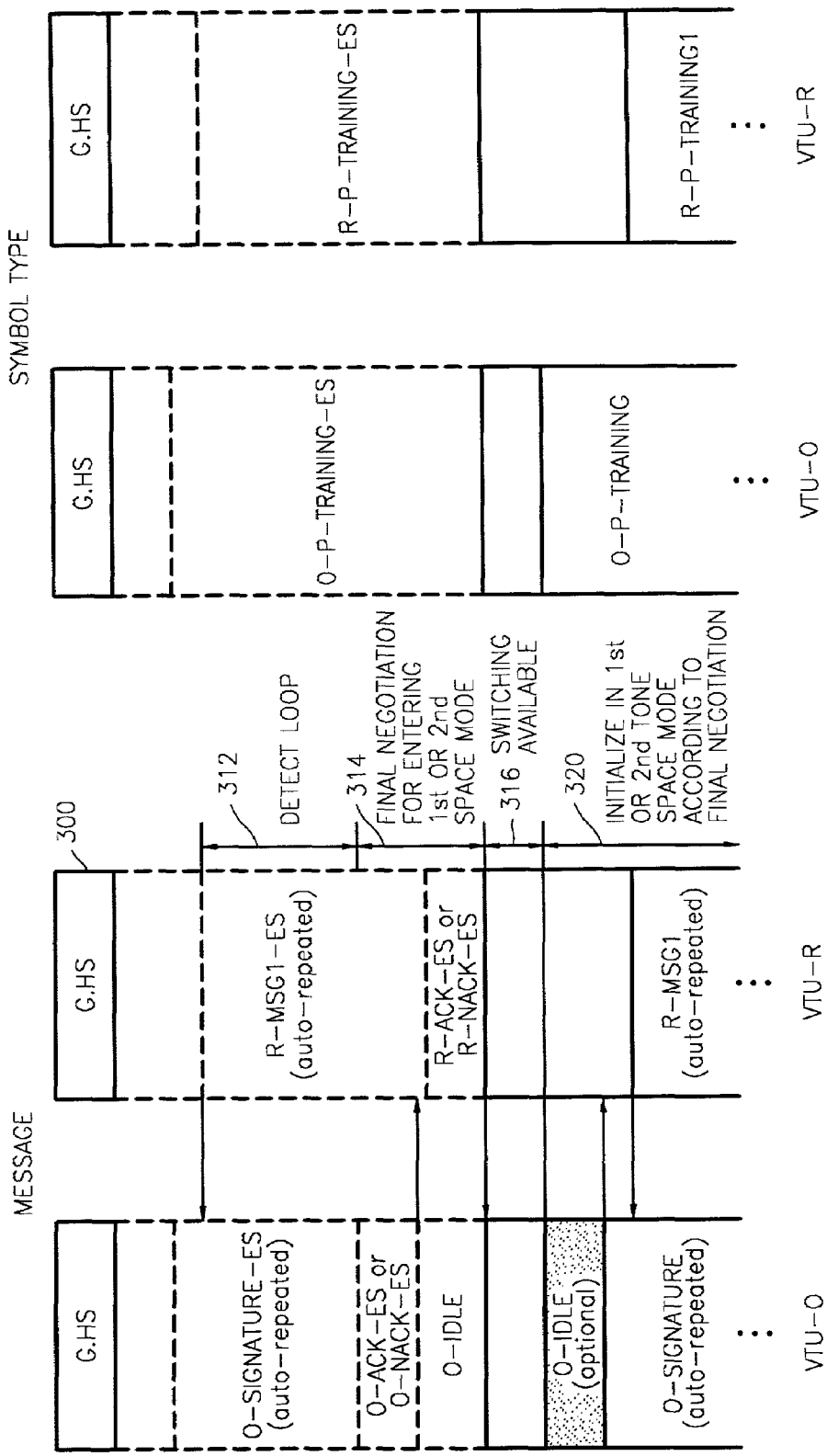
FIG. 3 is a diagram for explaining an initializing process between two stations for VDSL according to an embodiment of the present disclosure.

FIG. 2 is a flowchart for explaining an initializing method for a VDSL according to the present invention, and FIG. 3 is a diagram for explaining an initialization process between two stations for VDSL according to a preferred embodiment of the present invention.

First, if a connection process begins between a VDSL Transceiver Unit at the Optical network unit (VTU-O) and a VDSL Transceiver Unit at the Remote site (VTU-R) as the two stations, the two modems begin an initialization process in a first tone space mode, preferably, based on a 4.3125 kHz tone space at present. Start of the initialization process, that is, a handshaking process in the first tone mode is performed in step 200. In the handshaking process, it is determined whether or not a switching (Escape to Switch tone spacing, ES) process for adjusting a tone space can be supported in step 210.

Preferably, in the handshaking process, it is checked through message exchange whether or not there is 8.625 kHz capability between the VTU-O and the VTU-R. Then, if both sides of the VTU-O and the VTU-R are capable of supporting the 8.625 kHz space, the ES process according to the present disclosure begins in step 220.

Referring to FIG. 2, in the present disclosure, in order to reduce time which is taken in initialization when the 8.625 kHz tone space is used, an intermediate process, that is, the ES process 312 through 316, is applied to between the handshaking process 300 and the actual initialization process 320. Generally, information which is basically needed between two modems (for example, operation modes, an FFT size, a cyclic extension length, frequency band information, etc.) is exchanged in the handshaking process. This handshaking process is described in the ITU-T G.994.1 (G.HS) standard. In the actual initialization process, the two modems obtain all system parameters which are used in Showtime (a stage in which data is actually communicated) through training, channel estimation, data rate negotiation, etc., and apply the parameters to each of the two modems.

In the present disclosure, this intermediate process performs a short loop detection in step 312, using a plurality of identical signals used in the actual initialization process, and determines whether to perform the following actual initialization process 320 based on 8.625 kHz or based on original 4.3125 kHz in step 314, and then switches in a switching-available interval in step 316.

More specifically, the ES process begins by the VTU-O transmitting O-P-TRAINING-ES, which is a symbol, to the VTU-R. Here, symbol O-P-TRAINING-ES is substantially the same symbol as O-P-TRAINING in the actual initialization. At the same time, O-SIGNATURE-ES, which is an SOC message, is transmitted from the VTU-O to the VTU-R. More accurately, an O-SIGNATURE-ES message is encoded and embedded in the transmitted symbol O-P-TRAINING-ES. Here, the O-SIGNATURE-ES message, except a message code (ID), is substantially the same message as O-SIGNATURE in the actual initialization.

After synchronized with the VTU-O, the VTU-R decodes 0-SIGNATURE-ES, obtains needed information, and then transmits symbol R-P-TRAINING-ES to the VTU-0. Here, symbol R-P-TRAINING-ES is substantially the same symbol as R-P-TRAINING in the actual initialization. At the same time, a SOC message, R-MSG1-ES, is transmitted from the VTU-R to the VTU-0. More accurately, the R-MSG1-ES message is encoded and embedded in the transmitted R-P-TRAINING-ES symbol. Here, likewise, R-MSG1_ES, except a message code (ID), is substantially the same message as R-MSG1 in the actual initialization.

The above-described examples of the symbol and message transmitted and received between the VTU-O and the VTU-R correspond to basic information needed in data communications between the modems. For example, information on which band is used in an upstream channel, or on which band is used in a downstream channel may be transmitted to each other. The VTU-O and the VTU-R receives R-MSG1-ES and O-SIGNATURE-ES, respectively, and at the same time perform a short loop detection.

In order to measure the length of a loop, the VTU-O and the VTU-R perform a short loop detection at the same time. At this time, whether or not the actual initialization process based on the 8.625 kHz tone space will be performed after the ES process can be indicated by the level of Power Spectral Density (PSD) of a signal which is received in a high frequency band (for example, around 8 MHz). For example, each of the two modems informs the other side of the power of the signal which is transmitted by itself, and then, the other side can detect a short loop by the attenuation degree of the received signal.

Referring FIG. 2 again, if a short loop is detected in the ES process, that is, if it is determined that data speed can be improved using the 8.625 kHz tone space because the length of the loop is short in step 230, the actual initialization process is performed in a second tone space mode, preferably, based on 8.625 kHz at present, in step 240. Otherwise, as in the handshaking process, the actual initialization process is performed in the first tone space mode in step 250.

More specifically, after detecting the short loop, final negotiation for entering the first tone space mode or the second tone space mode may be performed. In the final negotiation, O-ACK-ES is transmitted as a positive answer message from the VTU-O to the VTU-R, and in response to this, R-ACK-ES is transmitted as a positive answer message from the VTU-R to the VTU-O. By doing so, intention that both sides will perform the initialization process based on the 8.625 kHz tone space is clearly transmitted to each other. Here, O-ACK-ES and R-ACK-ES will be confirmed by corresponding IDs that are predetermined between the two modems.

According to the result of the final negotiation, each of the two modems can switch its own modem structure from the first tone space mode to the second tone space mode. The switching is possible in a QUITE cycle (or an IDLE cycle) which precedes immediately before the actual initialization process. For example, when a tone index is calculated, the actual initialization process based on 8.625 kHz, except the fact that it is based on 8.625 kHz, is substantially the same as the actual initialization process based on the prior art 4.3125 kHz.

FIG. 5 illustrates an example of a message and a message code used in a switching process for adjusting a tone space.

Figure 4A:
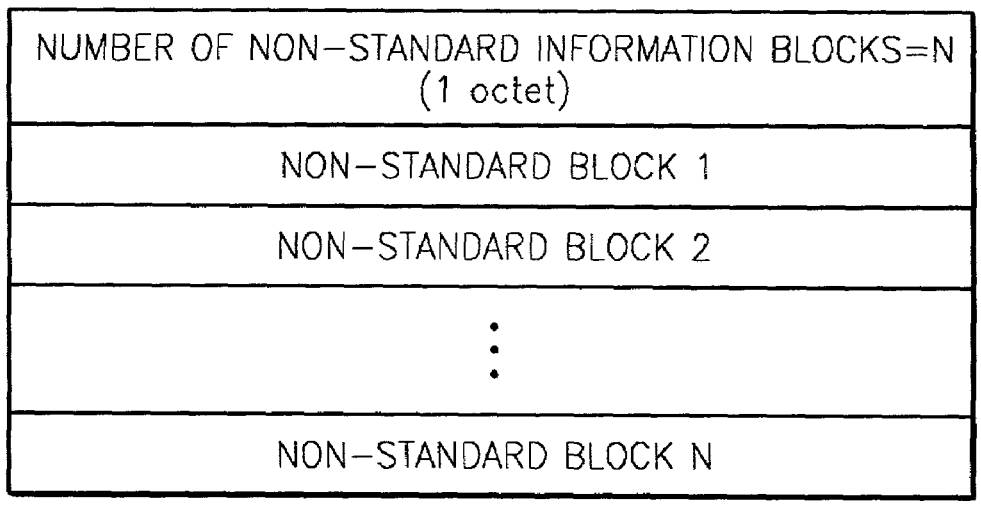
Figure 4B:
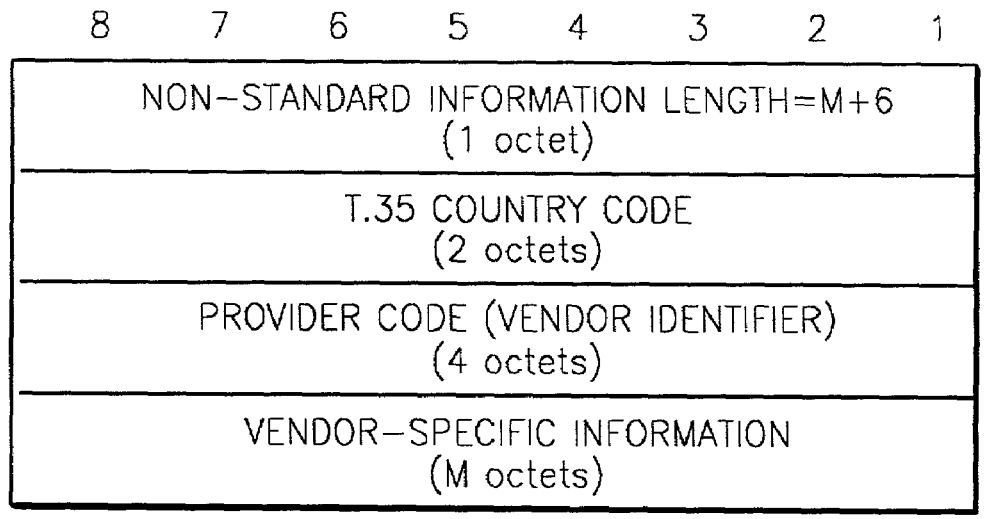

FIGS. 4*a* through 4*c* are diagrams for explaining a method for permission of 8.625 kHz tone space between two sides in a handshake process.

Preferably, the capability information of a modem for supporting the 8.625 kHz tone space is communicated using the G.994.1 HandShaking (G.HS) protocol. This capability information is transmitted through a non-standard information field. As defined in G.994.1, a "non-standard information field" parameter will be set as a one binary bit in the identification field of a transmission message.

Referring to FIG. 4*a*, the non-standard information field may be formed with one or more non-standard information blocks, and referring to FIG. 4*b*, a non-standard information block describes the 8.625 kHz tone space in two octets of a vendor-specific information field. A long fixed 14-bit binary sequence of 'MSB 10000110 110001 LSB (=$8625_{dec}$)' is used as an 8.625 kHz mode ID. As shown in FIG. 4*c*, the 8.625 kHz mode ID is mapped to bit 1 through bit 8 in the first octet and bit 3 through bit 8 in the second octet. Bit 1 in the second octet is used to represent the capability of 8.625 kHz tone space.

If the 8.625 kHz mode is the only information that is to be transmitted by the non-standard information field, the two octets defined in FIG. 4c are the entire payload of the vendor-specific information field of the non-standard information block in the non-standard information field. If one or more non-standard information blocks are used, the 8.625 kHz mode is specified in the last two octets of the last non-standard information block.

So far, the present invention is explained with exemplary embodiments. The 8.625 kHz second tone space in the present disclosure is just an exemplary embodiment of the present invention at present, and can be changed according to embodiments which need tone space adjustment. Also, though the VTU-O and the VTU-R are explained as the two stations, other stations in a master-slave relation may be used. In addition, the names and types of symbols and messages which are transmitted and received between the two stations in order to detect a short loop are just examples.

As described above, according to the present disclosure, when a 8.625 kHz tone space is used, a data communications link can be established with only one initialization process through the ES process according to the method and accordingly time for initialization is greatly reduced. In addition, since some identical signals used in the prior art actual initialization process are also used in the ES process, which is an intermediate process, additional hardware is not needed and in software aspect, it is easy to implement the system.

The present invention has been described by way of exemplary embodiments to which it is not limited. Variations and modifications will occur to those reviewing this disclosure, which do not depart from the scope of the invention as recited in the claims appended hereto.

What is claimed is:

1. An initializing method for a Very high bit rate Digital Subscriber Line (VDSL) between two stations, comprising:
    (a) handshaking basic, required information between the two stations in a first tone space mode having a first frequency, and for determining whether or not each of the two stations supports a second tone space mode having a second frequency that is different from the first frequency;
    (b) switching the first tone space mode to the second tone space mode by detecting a loop in each of the two stations for adjusting a tone space when it is determined in step (a) that each of the two stations supports the second tone space mode; and
    (c) exchanging information actually needed in data communications between the two stations in the second tone space mode when switched to the second tone space mode in step (b) for an actual initialization of the VDSL between the two stations.

2. An initializing method for a Very high bit rate Digital Subscriber Line (VDSL) between two stations, comprising:
    (a) handshaking basic, required information between the two stations in a first tone space mode, and for determining whether or not each of the two stations supports a second tone space mode;
    (b) switching the first tone space mode to the second tone space mode by detecting a loop in each of the two stations for adjusting a tone space when it is determined in step (a) that each of the two stations supports the second tone space mode; and
    (c) exchanging information actually needed in data communications between the two stations in the second tone space mode when switched to the second tone space mode in step (b) for an actual initialization,
    wherein the step (b) comprises:
    (b1) each station receiving a signal from the other station, using signals substantially identical to signals used in step (c), and at substantially the same time detecting the loop; and
    (b2) each station performing final negotiation for determining whether or not step (c) is to be performed in the second tone space mode, according to the result of the loop detection.

3. The method of claim 2, wherein in step (b1), each station obtains the result of the loop detection based on the level of Power Spectral Density (PSD) of a signal which is received in a high frequency band transmitted from the other station.

4. The method of claim 2, wherein the step (b) further comprises:
    (b3) each station switching from the first tone space mode to the second tone space mode in an idle cycle when it is determined that the step (c) is performed in the second tone space mode in step (b2).

5. The method of claim 1, wherein in step (a) whether or not the two stations are capable of supporting the second tone space is found by exchanging messages, and capability information is transmitted through a non-standard information field.

6. The method of claim 1, wherein the two stations are a modem at an optical network unit and a modem at a remote terminal, respectively.

7. A system supporting an initializing method for a Very high bit rate Digital Subscriber Line (VDSL), the system having two stations, each of which performs:
    a handshaking step for exchanging basic, required information between the two stations in a first tone space mode having a first frequency;
    a switching step for switching from the first tone space mode to a second tone space mode having a second frequency different from the first frequency by detecting a loop, if it is determined that the station supports the second tone space mode; and
    an actual initialization step for exchanging information actually needed in data VDSL communications between the two stations in the second tone space mode when switched to the second tone space mode.

8. A system supporting an initializing method for a Very high bit rate Digital Subscriber Line (VDSL), the system having two stations, each of which performs:
    a handshaking step for exchanging basic, required information between the two stations in a first tone space mode;
    a switching step for switching from the first tone space mode to a second tone space mode by detecting a loop, if it is determined that the station supports the second tone space mode; and
    an actual initialization step for exchanging information actually needed in data communications between the two stations in the second tone space mode when switched to the second tone space mode.
    wherein the switching step comprises:
    each station receiving a signal the other station, using signals substantially identical to signals used in the actual initialization step, and at substantially the same time detecting the loop; and
    each station performing final negotiation for determining whether or not the actual initialization step is to be performed in the second tone space mode, according to the result of the loop detection.

9. The system of claim 8, wherein the result of the loop detection is obtained by each station, based on the level of Power Spectral Density (PSD) of a signal which is received in a high frequency band transmitted from the other station.

10. The system of claim 7, wherein in the handshaking step, whether or not the two stations are capable of supporting the second tone space is found by exchanging messages, and capability information is transmitted through a non-standard information field.

11. The system of claim 7, wherein the two stations are a modem at an optical network unit and a modem at a remote terminal, respectively.

* * * * *